US005654074A

United States Patent [19]

Smith

[11] Patent Number: 5,654,074

[45] Date of Patent: Aug. 5, 1997

[54] PAINT DRIP AND SPLATTER PROTECTOR

[76] Inventor: Lloyd Smith, P.O. Box 1661, Columbia, La. 71418

[21] Appl. No.: 386,448

[22] Filed: Feb. 10, 1995

[51] Int. Cl.[6] .............................. B32B 7/00; B05C 11/11

[52] U.S. Cl. .............................. 428/120; 428/167; 428/178; 428/192; 428/188; 118/504

[58] Field of Search .............................. 428/167, 178, 428/188, 119, 120, 121, 174, 192; 118/504, 505

[56] References Cited

U.S. PATENT DOCUMENTS 3,246,746 4/1966 Holley .............................. 428/178

3,935,357 1/1976 Padovani .............................. 428/178

4,835,026 5/1989 Horiki et al. .............................. 428/178

5,192,602 3/1993 Spencer et al. .............................. 428/184

*Primary Examiner*—Donald Loney

*Attorney, Agent, or Firm*—Alfred E. Miller

[57] ABSTRACT

A device for protecting floors and floor coverings from paint and splatter having a board with flexible lips that can seal the wall from the floor surfaces. The device can also be bent to accommodate curved surfaces, such as columns.

6 Claims, 2 Drawing Sheets

FIG.1
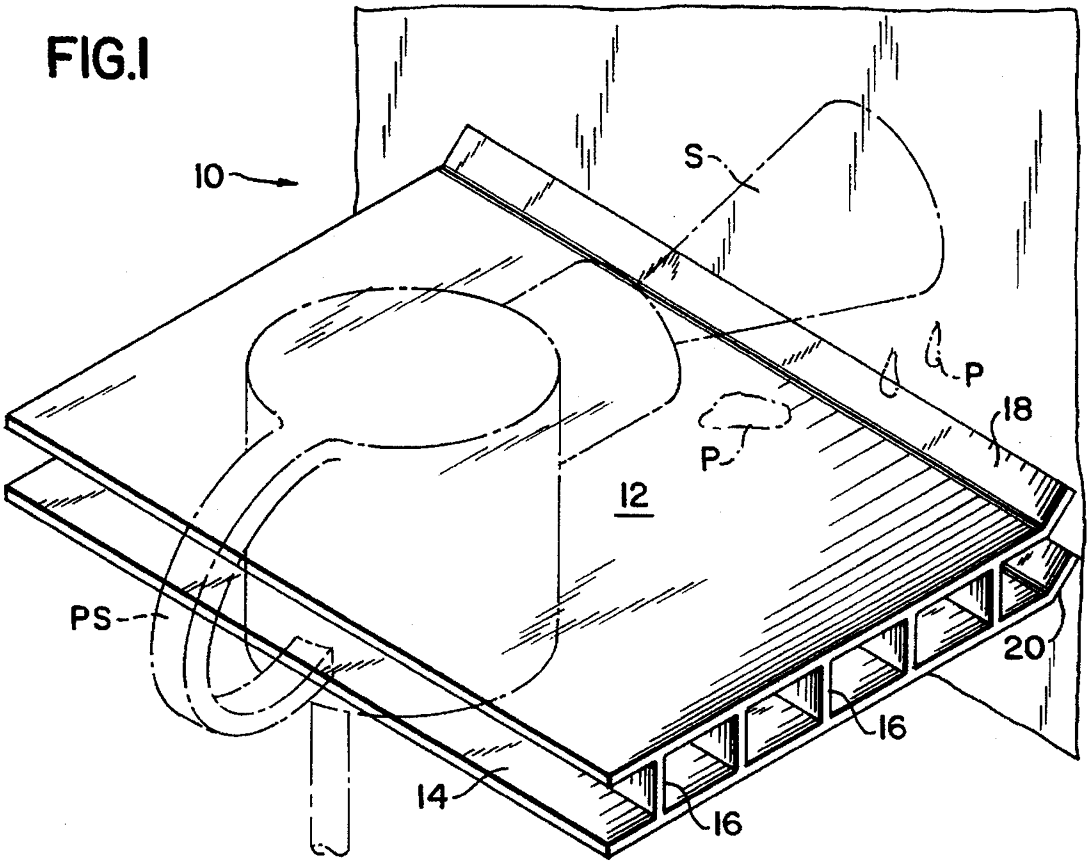
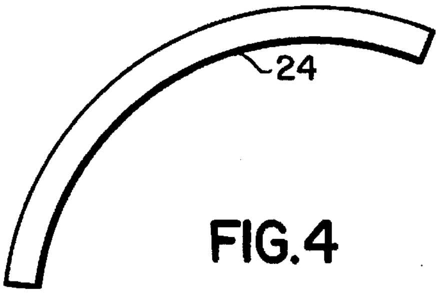
FIG.4
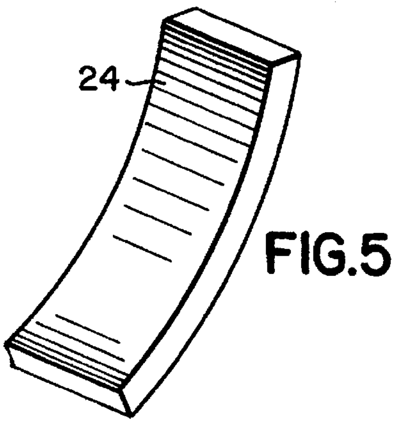
FIG.5

PAINT DRIP AND SPLATTER PROTECTOR

The present invention relates to a device for protecting a floor or floor covering from being splattered or dripped upon when spray painting, roller or brush painting walls, doors or windows. The invention is designed for use within a structure but can be utilized in connection with the painting or spraying of the outside of buildings or structures.

BACKGROUND OF THE INVENTION

In the past it was customary for painters to use drop cloths or newspapers for protecting areas in a structure that were not to be painted from paint droppings and splatters. These protective methods quite often did not prevent paint from dripping down the wall to the juncture where the wall meets the floor since the drop cloth or other type of paint protection device does not adequately seal the wall or baseboard thereby preventing paint from falling on the edges between the wall and the floor or floor coverings.

It is an object of the present invention to provide a paint splatter protector or shield board that is provided with marginal flexible lips that when pressed against a wall or baseboard flexes to form a seal against the wall or baseboard thereby preventing the paint being applied to the wall from dripping between the board and the adjacent wall or baseboard.

It is a further object of the present invention to provide a paint protector board of a plastic composition having a top relatively rigid sheet and a bottom relatively rigid sheet separated by a plurality of substantially perpendicular connecting pieces forming a fluted, somewhat flexible board having at least one marginal edge having upper and lower lips that are not supported or connected, and which are freely flexible.

Another object of the present invention is to provide a paint protector board which permits the board to be creased across the flutes so that the board can be angled to be placed between the edge of wall and the floor carpet to thereby effectively seal the marginal edge of the carpet from paint drippings or splatters.

A further feature of the present invention is the use of a paint protector board that can be bent around curved areas such as the bottom of a circular column thereby protecting the adjacent floor surfaces or carpet areas.

Another feature of the present invention is to provide a somewhat flexible paint protector board with flexible marginal lips that are cleanable and reusable, as well as being light weight and easily transportable, but also has considerable load bearing characteristics since it has a high strength-to-weight ratio and is abrasion resistant.

The above and other objects and features of the invention will become apparent by reference to the following description of my invention and the drawings.

BRIEF DESCRIPTION OF THE DRAWINGS

FIG. 1 is a perspective view, partially cutaway, showing the paint drip and splatter protector with flexible marginal lips constructed in accordance with the teachings of my present invention, and showing a paint sprayer in use with the device.

FIGS. 4 and 5 show views in elevation and perspective respective of the device of FIG. 1 which is bent to provide a curvalinear configuration to engage structures having curved surfaces for painting, such as columns.

DESCRIPTION OF THE PREFERRED EMBODIMENT

Figure 2:
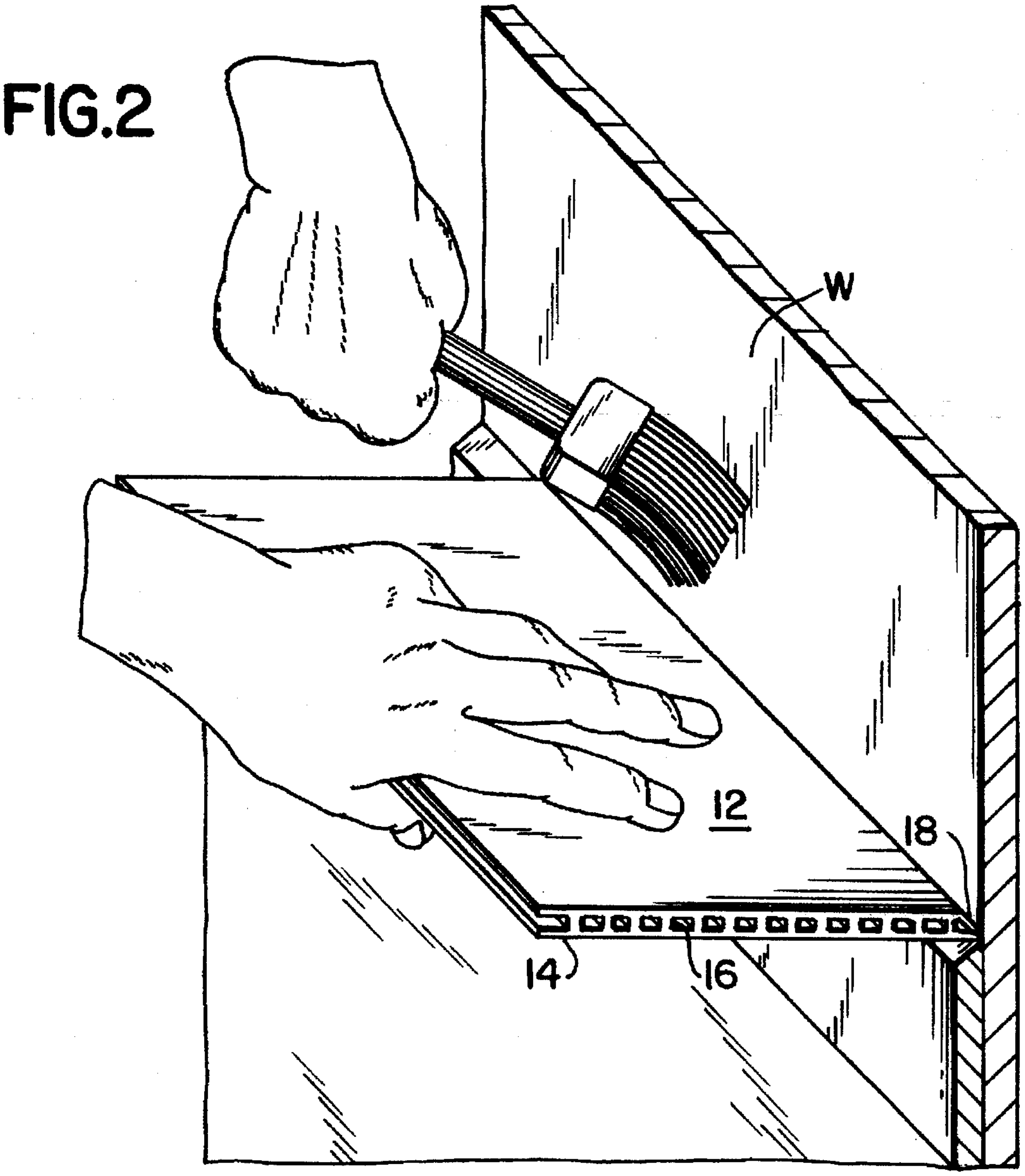
FIG. 2 is a perspective view showing the application of my paint drip and splatter protector applied to a wall being painted and resting on the baseboard thereof.

The device as shown in the figures is a paint and splatter protector referred to generally by the reference numeral 10. The protector is in the form of a rectangular board having an upper plastic sheet 14 and connected together by special upstanding members 16 to form a fluted board construction. The members 16 are also constructed of plastic. At least one side edge of the paint and splatter protector is unsupported thereby forming flexible marginal upper edge 18 and flexible marginal lower edge 20. It is preferred to fabricate the plastic sheets and the plastic connecting members of polypropylene.

When a painter desires to spray, roller or brush paint a wall, it is necessary to have some means to protect surfaces or objects that are not to be painted. Drop cloths, which are widely used by painters, are not completely satisfactory since it is difficult to prevent dripping or splattering to the floor surface or on wall-to-wall carpeting at the juncture where the wall meets the floor. Consequently, my device which is a relatively stiff and elongated board but is capable of being bent to both a flat surface and a curved surface, is provide with flexible lips 18 and 20 which is bent along flute lines and flexes against dripping or splattering of paint on the floor or the carpet.

As seen in FIG. 1, the paint sprayer PS with a nozzle S is directed against a wall W. Because of the volume of the paint spray it is important to prevent paint drippings from falling on the floor surfaces, and this is accomplished by the use of the protector 10 having lips 18 and 20 pressed upwardly against the wall W. As seen in FIG. 1, the paint drippings P are prevented from falling on the floor because of the upturned lip 18, and consequently may form a puddle $P^1$ on the upper plastic sheet 12.

Figure 3:
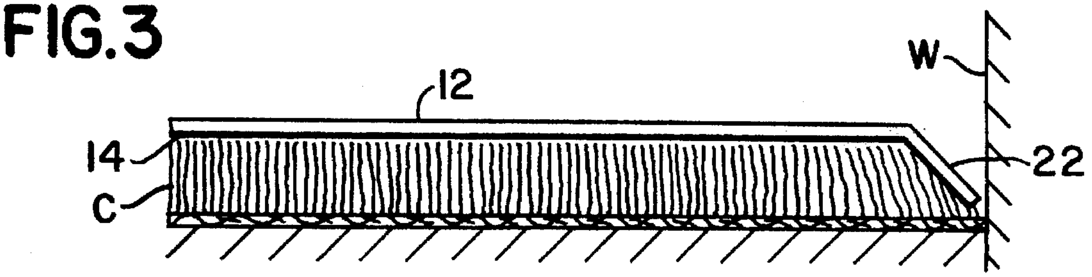
FIG. 3 is a side elevation view of the device of FIG. 1 applied to a wall to be painted and protecting the carpeting or floor.

As seen in FIG. 3, when painting in a room with wall-to-wall carpeting, the flexible marginal edges 18 and 20 are bent to form a lip 22 at a downward angle relative to the plastic sheets 12 and 14 in order to prevent paint from dripping or splattering on the edge of the carpet C.

FIGS. 4 and 5 show the present protector being bent to a curved configuration 24 so that the present paint protector can be used on curved objects or construction such as columns, so that the flexible lips are able to be in intimate contact with the curved surfaces to be painted.

It should be apparent that the present paint and splatter protector can be effectively used when painting with a brush or when spray painting. Obviously, in the latter case, there is more need for splatter protection.

When the invention has been disclosed and described with reference to certain embodiments of the invention it will be apparent that changes and modifications may be made therein, and it is therefore intended in the following claims to cover each such variation and modification that falls within the true spirit and scope of the invention.

What I claim is:

1. A paint drip and splatter protector for a wall or baseboard comprising spaced upper and lower plastic sheets, spaced members connecting said upper and lower sheets and disposed substantially perpendicular to said sheets to form a fluted board construction, at least one marginal edge of said board having at least one unsupported flexible lip of a single thickness for sealing contact with said wall or baseboard, when placed flush against a wall and in intimate contact therewith.

2. A paint drip and splatter protector as claimed in claim 1 wherein the marginal edge of both said upper and lower plastic sheets are provided with unsupported flexible lips of a single thickness for engaging a wall to be painted.

3. A paint drip and splatter protector as claimed in claim 1 wherein said plastic sheets forming said board are fabricated of polypropylene.

4. A paint drip and splatter protector as claimed in claim 1 wherein said board is substantially rectangular and is provided with a flute line substantially parallel to said marginal edge, and can be bent and creased along said flute line to form a marginal edge that is angularly disposed relative to the remainder of said board.

5. A paint drip and splatter protector as claimed in claim 2 wherein said flexible lips each are bent upwardly into engagement with said wall.

6. A paint drip and splatter protector as claimed in claim 1 wherein said flexible lip is bent downwardly into engagement with said walls.

* * * * *